Patented Oct. 20, 1931

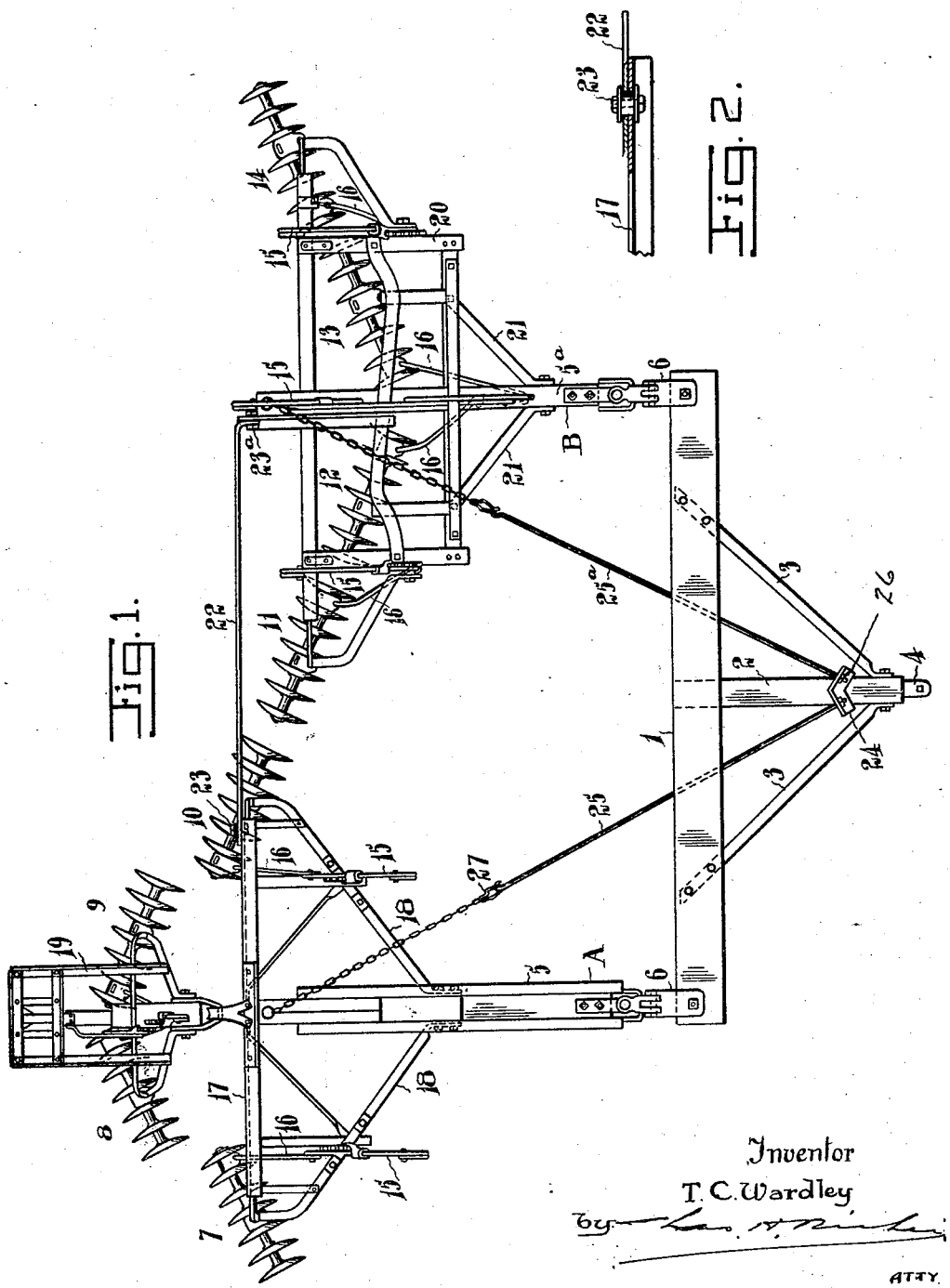

1,827,920

UNITED STATES PATENT OFFICE

TIMOTHY CLARK WARDLEY, OF ELORA, ONTARIO, CANADA, ASSIGNOR TO T. E. BISSELL COMPANY LIMITED, OF ELORA, CANADA, A CORPORATION OF CANADA

DISK HARROW

Application filed September 17, 1930. Serial No. 482,588.

This invention relates to a disk harrow composed of a plurality of separate or individual harrow units arranged side by side in parallel spaced relation and connected to a draft attachment for a relatively considerable width of cut at each traverse of the harrow; the object of the invention being; to so connect each unit to the draft attachment that it can undulate lengthwise and transversely of the line of draft independently of or in unison with the other unit or units; to maintain the units in their parallel spaced relation without impeding their transverse undulations; and to uniformly distribute the pulling or drawing strain from the draft attachment to each unit.

In carrying out the invention the harrow is composed of:—several separate or individual units each comprising a center frame, a plurality of pairs of disk gangs adjustably connected to it, and means for adjusting the cutting angles of the gangs; a draft attachment comprising a dragbar extending transversely across the center frames, a stub pole forward of the dragbar for connecting the harrow to the motive power, and means for flexibly connecting the center frames of the units to the dragbar for the undulating movements of the units lengthwise and transversely of the line of draft; a flexible spacing bar connecting the frames together in rear of the dragbar for maintaining them in parallel spaced relation and permitting of the undulations of the units transversely to the line of draft; and an adjustable flexible stay for each unit connected at its forward end to the draft attachment and at its rear end with its respective center frame between the dragbar and the spacing bar for overcoming the unevenness of the draft of the units.

For an understanding of the invention reference is to be had to the following description and to the accompanying drawings in which:—

Fig. 1 is a plan view of the disk harrow; and

Fig. 2 is a fragmentary detail of the spacing bar.

Like characters of reference refer to like parts throughout the specification and drawings.

The harrow may consist of any number of separate or individual harrow units flexibly connected to a draft attachment and each unit may comprise a center frame and a group of disk gangs connected with it. The harrow shown in the drawings consists of two units A and B connected to a draft attachment which comprises a dragbar 1, a stub pole 2 extending forwardly from the middle of the dragbar, braces 3 located one at each side of the stub pole and extending diagonally from it to the dragbar, and a coupling 4 for the attachment of the harrow to the motive power. The center frames 5, 5a of the two units A and B respectively are flexibly connected by couplings 6 to the dragbar 1 for the undulations of each unit lengthwise and transversely of the line of draft in unison with or independently of the other. Four disk gangs numbered 7 to 10 inclusive are connected to the center frame 5 and four disk gangs numbered 11 to 14 inclusive are connected to the center frame 5a and levers 15 and rods 16 are provided for the adjustment of the disk gangs when altering the cutting angles of the harrow.

The disk gangs 7 and 10 are coupled by a beam 17 connected with the center frame 5 by drawbars 18, and the disk gangs 8 and 9 are provided with a frame 19 attached to the center frame 5 in rear of the disk gangs 7 and 10. The disk gangs 11 to 14 inclusive are connected with a frame 20 attached to the center frame 5a by drawbars 21.

The center frames are arranged and maintained in parallel spaced relation by the dragbar 1 to which their forward ends are flexibly attached and by a flexible spacing bar 22 secured to them in rear of the dragbar. In the construction shown in the drawings the spacing bar is flexibly secured to the beam 17 by a bolt 23 and flexibly secured to the center frame 5a by a similar bolt 23a entered through them for pivotally connecting them together and providing for the flexions of the spacing bar to permit of the undulations of the units transversely of the line of draft.

Attached to the stub pole 2 forward of the dragbar 1 is a bracket 24 and secured to the bracket are the forward ends of two flexible stays 25, 25a which extend diagonally from the bracket and are secured to the center frames 5, 5a respectively in rear of the dragbar for uniformly distributing the pulling or drawing strain from the draft attachment to the two frames, without interfering with the lengthwise and transverse undulations of the units.

To overcome the unevenness of the drag of the two units each of the stays 25, 25a is lengthwise adjustable. In the construction shown in the drawings this adjustment is effected by entering the ends of the stays through the bracket 24 and providing them on the forward side of the bracket with nuts 26 and interjacent the bracket and their attachment to the center frames with grab links 27 but other means such as a turn-buckle or the like maybe employed for effecting the adjustment.

Having thus fully described my invention what I claim as new and desire to secure by Letters Patent is:—

1. In a disk harrow a draft attachment comprising a dragbar and coupling means forward of the dragbar for connecting the harrow to the motive power; a plurality of harrow units each comprising a center frame flexibly connected at its forward end to the dragbar for the undulating movements of the unit lengthwise and transversely of the line of draft; a spacing bar flexibly connecting the center frames together in rear of the dragbar for maintaining their spaced relation and permitting of the undulating movement of each unit transversely of the line of draft; and flexible stays each connected at its forward end with the draft attachment and at its other end with one of the center frames between the dragbar and the spacing bar.

2. A disk harrow as claimed in claim 1 having a plurality of pairs of disk gangs connected to each center frame and means for adjusting the gangs when altering the cutting angles of the harrow.

3. A disk harrow as claimed in claim 1 having adjustable flexible stays for distributing the drawing or pulling strains to the center frames and overcoming the unevenness of the draft of the units.

Dated at Elora this second day of September, 1930.

TIMOTHY CLARK WARDLEY.